(12) United States Patent
Ozzie et al.

(10) Patent No.: US 8,775,554 B2
(45) Date of Patent: Jul. 8, 2014

(54) CLOUD-BASED WEB PAGE APPLICATIONS FOR EXTENDING FUNCTIONALITY

(75) Inventors: Raymond E. Ozzie, Seattle, WA (US); George Moromisato, Seattle, WA (US); Jack Ozzie, North Bend, WA (US)

(73) Assignee: Microsoft Corporation, Redmond, WA (US)

( * ) Notice: Subject to any disclaimer, the term of this patent is extended or adjusted under 35 U.S.C. 154(b) by 253 days.

(21) Appl. No.: 12/981,494

(22) Filed: Dec. 30, 2010

(65) Prior Publication Data

US 2012/0173657 A1    Jul. 5, 2012

(51) Int. Cl.
*G06F 15/173* (2006.01)

(52) U.S. Cl.
USPC ......................................... 709/217

(58) Field of Classification Search
None
See application file for complete search history.

(56) References Cited

U.S. PATENT DOCUMENTS

| | | | | |
|---|---|---|---|---|
| 5,963,916 | A * | 10/1999 | Kaplan | 705/7.29 |
| 6,141,010 | A * | 10/2000 | Hoyle | 715/854 |
| 6,297,819 | B1 * | 10/2001 | Furst | 715/733 |
| 6,356,543 | B2 * | 3/2002 | Hall et al. | 370/352 |
| 6,421,726 | B1 * | 7/2002 | Kenner et al. | 709/225 |
| 7,546,534 | B1 * | 6/2009 | Andrews et al. | 715/747 |
| 7,975,019 | B1 * | 7/2011 | Green et al. | 709/217 |
| 8,108,492 | B2 * | 1/2012 | Arunachalam | 709/219 |
| 2003/0119386 | A1 * | 6/2003 | Laux et al. | 439/894 |
| 2006/0080468 | A1 | 4/2006 | Vadlamani et al. | |
| 2008/0307301 | A1 * | 12/2008 | Decker et al. | 715/241 |
| 2009/0100425 | A1 | 4/2009 | Russell | |
| 2010/0179949 | A1 | 7/2010 | Safar | |
| 2010/0318649 | A1 * | 12/2010 | Moore et al. | 709/224 |
| 2011/0208801 | A1 * | 8/2011 | Thorkelsson et al. | 709/203 |
| 2012/0042036 | A1 * | 2/2012 | Lau et al. | 709/217 |

FOREIGN PATENT DOCUMENTS

WO    0016195 A1    3/2000

OTHER PUBLICATIONS

"StumbleUpon 3.73", Retrieved at << http://download.cnet.com/StumbleUpon/3000-11745_4-10470743.html >>, Nov. 7, 2008, pp. 6.

(Continued)

*Primary Examiner* — Scott Christensen
(74) *Attorney, Agent, or Firm* — Micah Goldsmith; Glen Johnson; Micky Minhas

(57) ABSTRACT

Embodiments extend functionality of a web page using cloud-based page applications. A page application provider, executing as part of a web browser, receives notification of a web page being accessed by a user of a user computing device. One or more page applications associated with the web page are identified. The identified page applications provide functionality related to the web page and, in some embodiments, interact or share data with the web page. The page application provider presents the identified page applications to the user. Based on a selection of at least one of the presented page applications, the selected page application is provided for execution by the user computing device. In some embodiments, the correlations among the user, web pages, and page applications are available from a cloud-based page application service.

20 Claims, 7 Drawing Sheets

(56) References Cited

OTHER PUBLICATIONS

Sacred., "Fox Notifier—Follow Facebook, Twitter, Craigslist, Blogger", Retrieved at << https://addons.mozilla.org/en-US/firefox/addon/13020 >>, Apr. 8, 2010, pp. 4.

Placek, et al., "G-Monitor: A Web Portal for Monitoring and Steering Application Execution on Global Grids", Retrieved at << http://www.buyya.com/papers/gmonitor.pdf >>, International Workshop on Challenges of Large Applications in Distributed Environments, Jun. 21, 2003, pp. 9.

"Adobe Marketplace & Exchange," Retrieved at << http://www.adobe.com/cfusion/exchange/?promoid=DIOCO >>, Nov. 18, 2010, pp. 2.

"FAQ—Greasespot," Retrieved at << http://wiki.greasespot.net/index.php?title=FAQ&printable=yes >>, Nov. 18, 2010, pp. 4.

"Google Toolbar Web-browsing tools: Custom buttons," Retrieved at << http://www.google.com/support/toolbar/bin/answer.py?hl=en&answer=31241, Dec. 28, 2010, pp. 1.

"Notice on the First Office Action", China, 201110452041.0, Mailed Date: Jan. 6, 2014, pp. 16.

\* cited by examiner

US 8,775,554 B2

CLOUD-BASED WEB PAGE APPLICATIONS FOR EXTENDING FUNCTIONALITY

BACKGROUND

Existing applications enable users to install "plug-in" applications that extend the functionality of the existing applications. Users select and install the plug-ins to obtain the functionality. For example, some existing web browsers have a plug-in architecture enabling users to download plug-ins for execution when visiting certain web pages with the web browsers. The plug-ins are installed locally on the computing device of the user executing the web browser. With the existing systems, however, the user is unable to access the installed plug-ins when browsing the web pages with another computing device. Additionally, with the existing web browser plug-in architecture, the web pages generally remain unaware of the existence or execution of the plug-ins.

SUMMARY

Embodiments of the disclosure receive notification of a web page being accessed by a user of a user computing device. One or more page applications associated with the web page are identified. The identified page applications provide functionality related to the web page. The identified page applications are presented to the user. A selection of at least one of the presented page applications is received from the user. The selected page application is provided for execution by the user computing device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
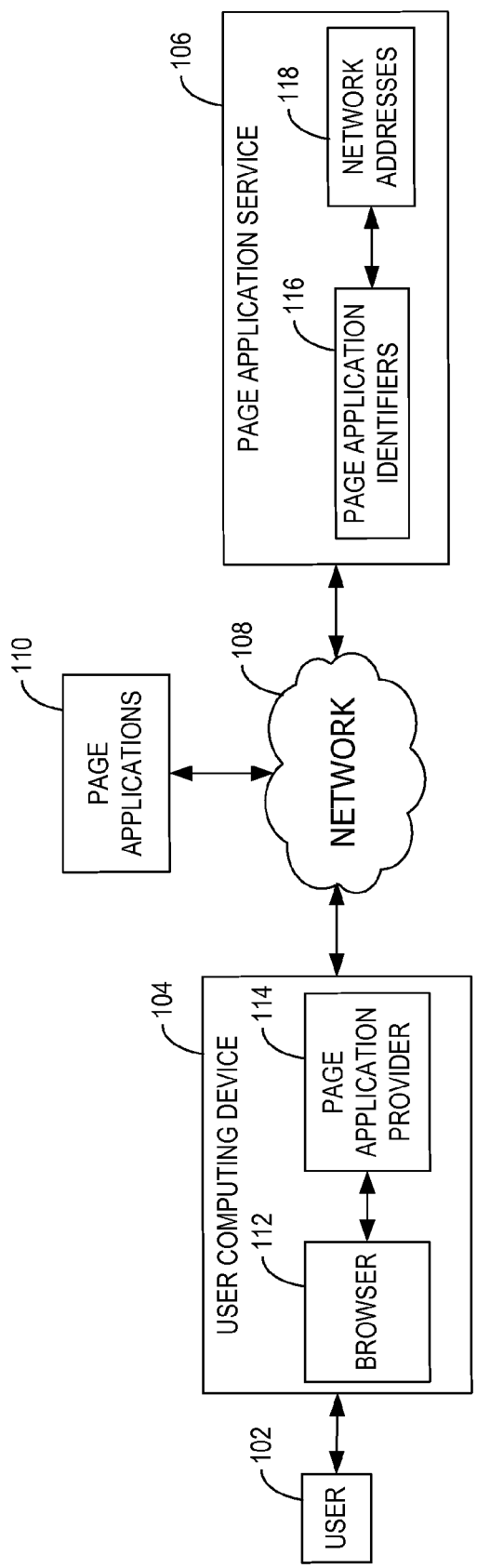
FIG. 1 is an exemplary block diagram illustrating a user computing device communicating with a page application service to obtain page applications for execution.

Referring to the figures, embodiments of the disclosure extend the functionality of web pages using page applications 110. In some embodiments, a page application provider 114 monitors web browsing of a user 102 and identifies applicable page applications 110 based on the monitored web browsing. The relationships among the users 102, web pages, and page applications 110 are stored by a page application service 106.

Aspects of the disclosure enable interoperability and facilitate data exchange among web sites and/or applications. For example, the user 102 is able to send images from a photo web site to a mail web site using one of the page applications 110. In another example, one of the page applications 110 clips images from a web page and saves them to a scrapbook web site. In still another example, while the user 102 is viewing a web page, one of the page applications 110 searches microblog postings for conversations involving the web page.

In some embodiments, the page applications 110 represent web applications or executables. For example, the page applications 110 may take the form of standalone applications, JAVASCRIPT brand code, hypertext markup language (HTML) with JAVASCRIPT brand code, and the like.

Referring again to FIG. 1, an exemplary block diagram illustrates a user computing device 104 communicating with the page application service to obtain page applications 110 for execution. At least one user 102 interacts with the user computing device 104. The user computing device 104 communicates with the page application service 106 via a network 108 such as the Internet. The page application service 106, in some embodiments, is a cloud-based service. The page application service 106 identifies page applications 110 associated with web pages. In some embodiments, the page applications 110 are further associated with the user 102 such that different users 102 may have different page applications 110 associated therewith. The user computing device 104 executes the page applications 110 as described herein.

In some embodiments, the user computing device 104 executes a browser 112 or other application for obtaining and presenting the web pages to the user 102. For example, at least a portion of the functionality of the browser 112 may be incorporated into another application. The page application provider 114 operates to interact with the browser 112 and communicate with the page application service 106 as described herein to identify the page applications 110 associated with the web pages. In some embodiments, the page application provider 114 is a browser helper object, add-in, built-in, and/or plug-in to the browser 112. Alternatively or in addition, the page application provider 114 is an application that executes separately from the browser 112.

Each of the page applications 110 is operable on, or applicable to, one or more of the web pages. Conversely, one of the web pages may have one or more page applications 110 associated therewith and available for execution. Each of the page applications 110 is associated with a page application identifier 116, in some embodiments. The page application service 106 stores, maintains, or otherwise has access to, a correspondence between the page application identifiers 116 and one or more network addresses 118 corresponding to the web pages The relationship between the page application identifiers 116 and the network addresses 118 is further described with reference to FIG. 2 below.

Figure 2:
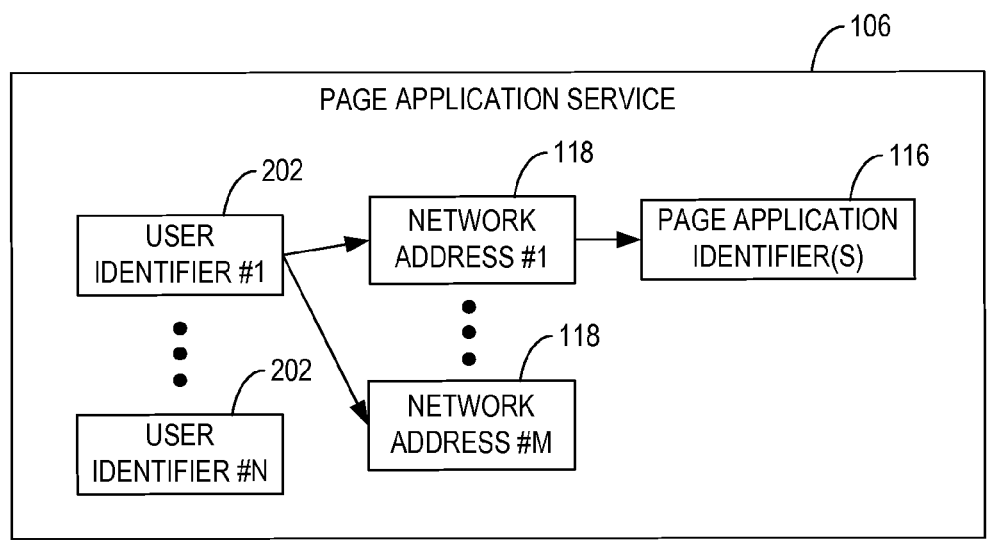
FIG. 2 is an exemplary block diagram illustrating the page application service storing correlations between user identifiers, network addresses, and page application identifiers.

Referring next to FIG. 2, an exemplary block diagram illustrates the page application service 106 storing correlations or mappings between user identifiers 202, network addresses 118, and page application identifiers 116. Each user 102 has at least one of the user identifiers 202 associated therewith, such as user identifier #1 through user identifier

N. For example, the user identifier 202 may be a login, username, email address, pointer to the user's identity, and/or any authentication data.

Each user identifier 202 is associated with, or corresponds to, one or more network addresses 118 such as network address #1 through network address #M. Each network address 118 corresponds to one or more of the web pages, and may take the form of Internet Protocol addresses, web page names, uniform resource locator patterns, or any other identifier of one or more web pages. For example, the network address 118 may correspond to a set of web pages, such as associated the web pages associated with a web site. In such instances, the network address 118 may include a top-level domain, or a wildcard such as "*" in the name. Each of the network addresses 118 is associated with, or corresponds to, one or more of the page application identifiers 116. In some embodiments, even though a particular page application 110 may be available for execution with a plurality of web pages, the user 102 may limit execution of the particular page application 110 to a subset of the plurality of web pages.

The relationships among the user identifiers 202, network addresses 118, and page application identifiers 116 identify the page applications 110 that are associated with, or available to, the web pages for each of the users 102. For example, the set of page application identifiers 116 for a particular network address 118 represent the page applications 110 that the user 102 has installed, that are available for installation, or both. The relationships illustrated in FIG. 2 are defined and updated based on, for example, user activity including browsing history, explicit user preferences, and/or inferred or implicit user preferences. The relationships may also be defined by an administrator of the user computing device 104, the user account, and/or the web pages. For example, a web site may define which page applications 110 are applicable to its web site and identify those page applications 110 to any user 102 who visits the web site (e.g., by listing the applicable page applications 110 in an extensible markup language file accessible by the browser 112). Alternatively, the web site may identify the page applications 110 to a subset of the users 102 (e.g., those users that may benefit from the page applications 110). For example, the subset of the users 102 corresponds to users 102 who have subscribed to the web site, or who are or have been customers of the web site.

In some embodiments, the page application service 106 stores a human-readable name as the page application identifier 116. For each page application 110 in the mapping illustrated in FIG. 2, the page application service 106 may further store an icon associated with the page application 110, a network address or other link (e.g., uniform resource locator) to a manifest file or other method for invoking the page application 110, and/or a network address or link to a web site of the developer of the page application 110.

Figure 3:
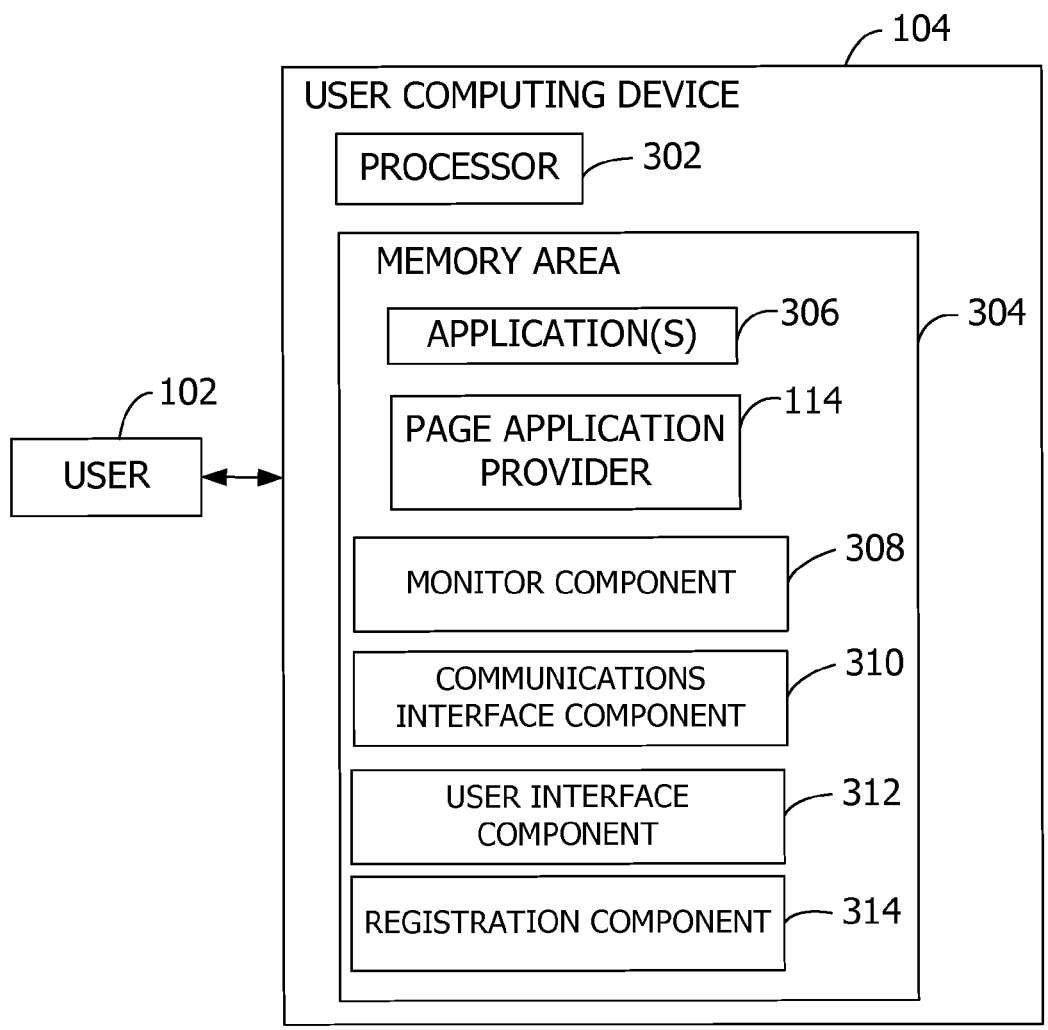
FIG. 3 is an exemplary block diagram illustrating the user computing device storing computer-executable components for obtaining and executing page applications.

Referring next to FIG. 3, an exemplary block diagram illustrates the user computing device 104 storing computer-executable components for obtaining and executing page applications 110. In the example of FIG. 3, the user computing device 104 is accessed by one or more users 102. The user computing device 104 represents any device executing instructions (e.g., as application programs, operating system functionality, or both) to implement the operations and functionality associated with the user computing device 104. The user computing device 104 may include a mobile computing device or any other portable device. In some embodiments, the mobile computing device includes a mobile telephone, laptop, netbook, gaming device, and/or portable media player. The user computing device 104 may also include less portable devices such as desktop personal computers, kiosks, and tabletop devices. Additionally, the user computing device 104 may represent a group of processing units or other computing devices.

The user computing device 104 has at least one processor 302 and a memory area 304. The processor 302 includes any quantity of processing units, and is programmed to execute computer-executable instructions for implementing aspects of the disclosure. The instructions may be performed by the processor 302 or by multiple processors executing within the user computing device 104, or performed by a processor external to the user computing device 104. In some embodiments, the processor 302 is programmed to execute instructions such as those illustrated in the figures (e.g., FIG. 4 and FIG. 5).

The user computing device 104 further has one or more computer-readable media such as the memory area 304. The memory area 304 includes any quantity of media associated with or accessible by the user computing device 104. The memory area 304 may be internal to the user computing device 104 (as shown in FIG. 3), external to the user computing device 104 (not shown), or both (not shown).

The memory area 304 stores, among other data, one or more applications 306. The applications 306, when executed by the processor 302, operate to perform functionality on the user computing device 104. Exemplary applications 306 include mail application programs, web browsers, calendar application programs, address book application programs, messaging programs, media applications, location-based services, search programs, and the like. With reference to FIG. 1, the applications 306 may also include the page application provider 114. The applications 306 may communicate with counterpart applications or services such as web services accessible via a network such as network 108. For example, the applications 306 may represent downloaded client-side applications that correspond to server-side services executing in a cloud.

The memory area 304 further stores the page application provider 114. The page application provider 114 includes computer-executable instructions implemented in hardware or software for performing the functionality described herein.

The memory area 304 further stores one or more computer-executable components. Exemplary components include a monitor component 308, a communications interface component 310, a user interface component 312, and a registration component 314. The monitor component 308, when executed by the processor 302 of the user computing device 104, causes the processor 302 to detect a request from the user 102 for access to a web page. For example, the user 102 may use the browser 112 to navigate to a web site, or request content from the web site.

The communications interface component 310, when executed by the processor 302 of the user computing device 104, causes the processor 302 to identify, to the page application service 106, the web page from the request detected by the monitor component 308. The communications interface component 310 further executes to receive, from the page application service 106, identification of one or more of the page applications 110 associated with the web page. The page applications 110, when executed, provide functionality related to the web page. In some embodiments, the communications interface component 310 includes a network interface card and/or computer-executable instructions (e.g., a driver) for operating the network interface card.

The communications interface component 310 may further receive, in some embodiments, one or more of the identified page applications 110 in anticipation of future execution of at least one of the identified page applications 110. For example, the communications interface component 310 may download the most popular of the identified page applications 110 that are not yet installed on the user computing device 104.

The user interface component 312, when executed by the processor 302 of the user computing device 104, causes the processor 302 to present the identified page applications 110 to the user 102. For example, the user interface component 312 may present the identified page applications 110 in a page curl, page peel, or other peel-away feature in a corner of the web page or a user interface displayed to the user 102 (e.g., see FIG. 6 and FIG. 7). Alternatively or in addition, the user interface component 312 may present the identified page applications 110 in a popup window, overlaid on the web page, in a particular portion of the web page or the user interface displayed to the user 102, or via another feature of the user interface.

The user interface component 312 further executes to receive, from the user 102, a selection of at least one of the presented page applications 110. The user computing device 104 then executes the selected page application 110 to provide the functionality of the selected page application 110. For example, if the selected page application 110 has been previously installed on the user computing device 104 (e.g., by the user 102 or another entity), the user computing device 104 proceeds to execute the selected page application 110. Alternatively, if the selected page application 110 is not currently installed on the user computing device 104, the user computing device 104 obtains the selected page application 110 (e.g., via the communications interface component 310) for installation (e.g., by the registration component 314 as described below).

In some embodiments, the user interface component 312 includes a graphics card for displaying data to the user 102 and receiving data from the user 102. The user interface component 312 may also include computer-executable instructions (e.g., a driver) for operating the graphics card. Further, the user interface component 312 may include a display (e.g., a touch screen display) and/or computer-executable instructions (e.g., a driver) for operating the display. The user interface component 312 may also include one or more of the following to provide data to the user 102 or receive data from the user 102: speakers, a sound card, a camera, a microphone, a vibration motor, and one or more accelerometers. For example, the user 102 may input commands or manipulate data by typing, speaking, gesturing, and/or moving the user computing device 104 in a particular way.

The registration component 314, when executed by the processor 302 of the user computing device 104, causes the processor 302 to identify to the page application service 106 the selected page application 110, the user 102, and the web page. For example, the registration component 314 identifies to the page application service 106 the page application identifier 116 associated with the selected page application 110, the user identifier 202 associated with the user 102, and the network address 118 associated with the web page. As such, the registration component 314 allows the page application service 106 to maintain the relationships among the users 102, web pages, and page applications 110.

In embodiments in which the selected page application 110 is not currently installed on the user computing device 104, the registration component 314 further executes to install the selected page application 110 on the user computing device 104. In some embodiments, the registration component 314 is executed separate from the other components illustrated in FIG. 3 when the user 102 installs one of the page applications 110. For example, the user 102 may browse to a developer web site and download one of the page applications 110. After installation of the downloaded page application, the registration component 314 updates the page application service 106 with information identifying the newly-installed page application, the developer web site, and the user 102.

Figure 4:
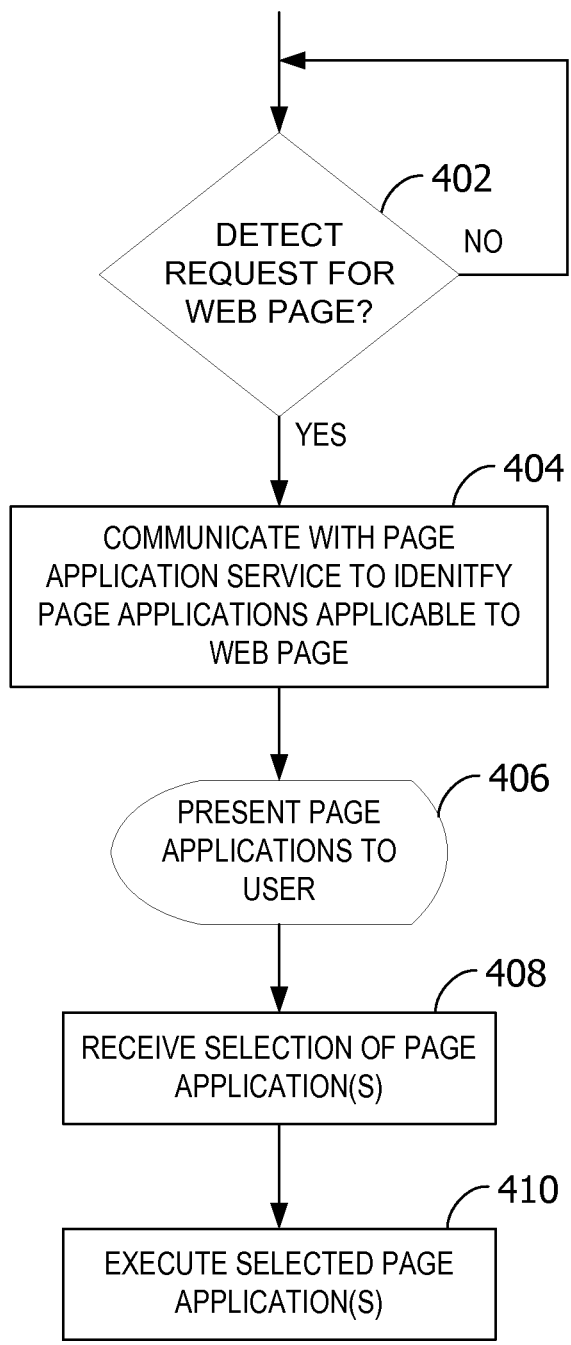
FIG. 4 is an exemplary flow chart illustrating operation of a page application provider executing on the user computing device to monitor web browsing and offer associated page applications.
Figure 5:
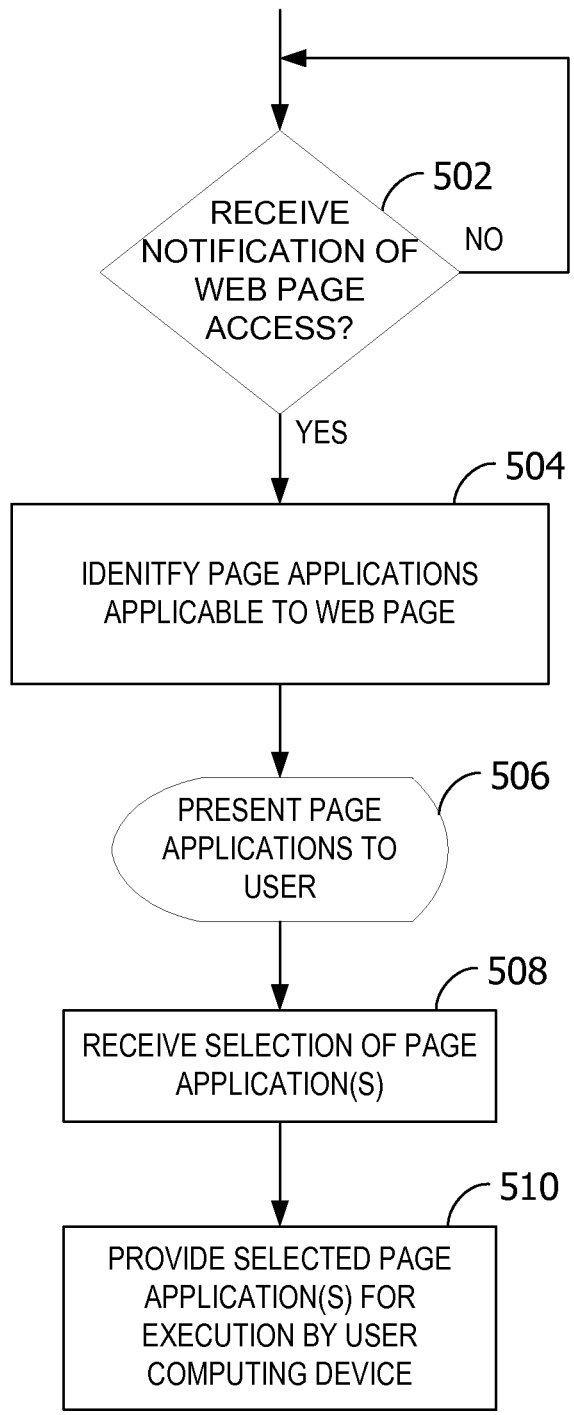
FIG. 5 is an exemplary flow chart illustrating operation of the page application service to provide page applications for a user based on web browsing.

Referring next to FIG. 4, an exemplary flow chart illustrates operation of the page application provider 114 executing on the user computing device 104 to monitor web browsing and offer associated page applications 110. The example of FIG. 4 illustrates embodiments in which the page application provider 114 (rather than the page application service 106 as illustrated in FIG. 5) executes to obtain the appropriate page application(s) 110. In some embodiments, the page application provider 114 is associated with the browser 112 and is executed by the user computing device 104. In other embodiments, the page application provider 114 is executed by a computing device separate, or remote, from the user computing device 104. In such embodiments, for example, the page application provider 114 may execute as a cloud service.

If a request for a web page is detected at 402, the page application provider 114 at 404 communicates with the page application service 106 to identify any page applications 110 applicable to the web page. The applicable page applications 110 include those that the user 102 has previously selected for association with the web page, or page applications 110 that are available for association with the web page (but not yet selected by the user 102). For example, the user computing device 104 may provide the page application service 106 with a network address 118 associated with the web page. The page application service 106 identifies one or more page application identifiers 116 associated with the network address 118 (e.g., the web page). The page application identifiers 116 returned to the user computing device 104 in this example correspond to the page applications 110 related to the web page.

In another example, the user computing device 104 provides the user identifiers 202 to the page application service 106. The page application service 106 then identifies the page applications 110 that are associated with the user identifier 202. The page application identifiers 116 returned to the user computing device 104 in this example correspond to the page applications 110 the user 102 has previously selected for execution when browsing any web page.

In still another example, the user computing device 104 both identifies the web page and provides the user identifier 202 to the page application service 106. The page application service 106 then identifies the page applications 110 that both correspond to the web page and are associated with the user identifier 202. The page application identifiers 116 returned to the user computing device 104 in this example correspond to the page applications 110 the user 102 has previously selected for execution when navigating to the web page.

At 406, the page applications 110 identified by the page application service 106 are presented to the user 102 by the user computing device 104. The page applications 110 may be presented to the user 102 with the web page, such as by the browser 112 and/or within a portion of the web page. Alternatively or in addition, the page applications 110 may be presented to the user 102 in another portion of the display of the user computing device 104 and/or by an application executing separately from the browser 112.

At 408, the user computing device 104 receives from the user 102 a selection of one or more of the presented page applications 110. For example, the user 102 may interact with the user interface of the user computing device 104 in any way for conveying the selection. The user computing device 104 then executes the selected page applications 110 at 410. For example, an operating system executing on the user computing device 104 may pass control from the browser 112 to the selected page applications 110, then return control back to the browser 112 when execution of the selected page applications 110 completes or concludes. From the user 102 perspective, the portion of the display showing the browser 112 may move to the background while the selected page applications 110 execute in the foreground. In another example, the selected page applications 110 execute within the context of the web page to enhance the web page or otherwise add the functionality to the web page.

In some embodiments, the selected page applications 110 may interact with the web page and/or share data during execution. For example, the output of the selected page applications 110 may alter the display of the web page (e.g., data output from the executing selected page applications 110 may be displayed in the web page). In another example, aspects of the disclosure contemplate generic import/export methods for exchanging data between the page applications 110 and the web page.

Referring next to FIG. 5, an exemplary flow chart illustrates operation of the page application service 106 to provide page applications 110 for the user 102 based on web browsing. In contrast to the example illustrated in FIG. 4, the operations illustrated in FIG. 5 are performed in some embodiments by the page application service 106. For example, the page application service 106 communicates with the user computing device 104 (e.g., the page application provider 114 executing thereon) to receive input, condition data, status data, or the like to perform the operations. In some embodiments, the page application service 106 is executed by a computing device remote, or separate, from the user computing device 104 (e.g., the page application service 106 is a cloud service). In other embodiments, at least a portion of the page application service 106 is executed by the user computing device 104 and communicates with the page application provider 114 to perform the operations illustrated in FIG. 5.

If notification of a web page being accessed by the user 102 of the user computing device 104 is received at 502 (e.g., the name or network address 118 of the web page is received), the page application service 106 identifies one or more of the page applications 110 associated with the web page and/or the user 102 at 504. The identified page applications 110 provide functionality associated with, or applicable to, the web page. The identified page applications 110 are presented to the user 102 at 506. For example, the page application service 106 sends the page application identifiers 116 corresponding to the identified page applications 110 to the user computing device 104. The user computing device 104 then displays the identified page applications 110 to the user 102.

The user 102 selects one or more of the presented page applications 110. The user computing device 104 (e.g., the page application provider 114 executing thereon) identifies the selected page applications 110 to the page application service 106. The page application service 106 receives the selection of the page applications 110 from the user computing device 104 at 508. The page application service 106 defines, or updates, a relationship among the user 102, the web page, and the selected page applications 110 such as illustrated in FIG. 2.

In some embodiments, the page application service 106 provides the page application provider 114 with the selected page applications 110 at 510 for execution by the user computing device 104. In other embodiments such as when the selected page applications 110 are already installed or cached on the user computing device 104, operation 510 is not performed (e.g., the selected page applications 110 are not sent by the page application service 106 to the user computing device 104).

Figure 6:
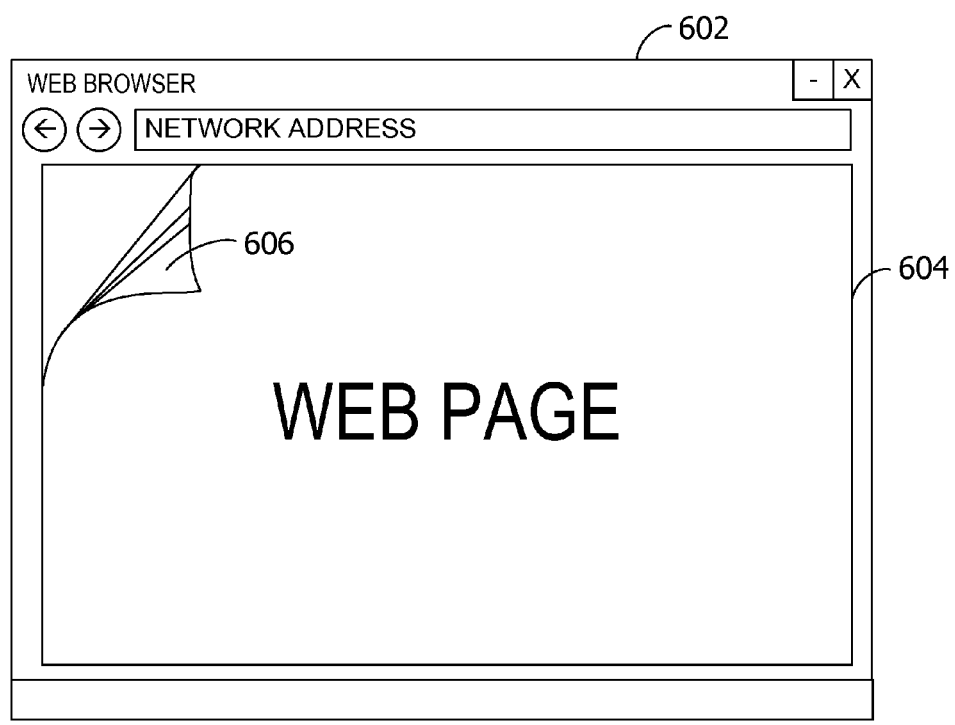
FIG. 6 is an exemplary user interface illustrating a web browser with a page curl indicating the availability of page applications for a web page.

Referring next to FIG. 6, an exemplary user interface illustrates a web browser 602 with a page curl 606 indicating the availability of page applications for a web page 604. The web browser 602 includes a field for entering the network address. A portion of the web browser 602 displays a web page 604. The web page 604 includes the page curl 606 indicating the availability of page applications associated with the web page 604.

Figure 7:
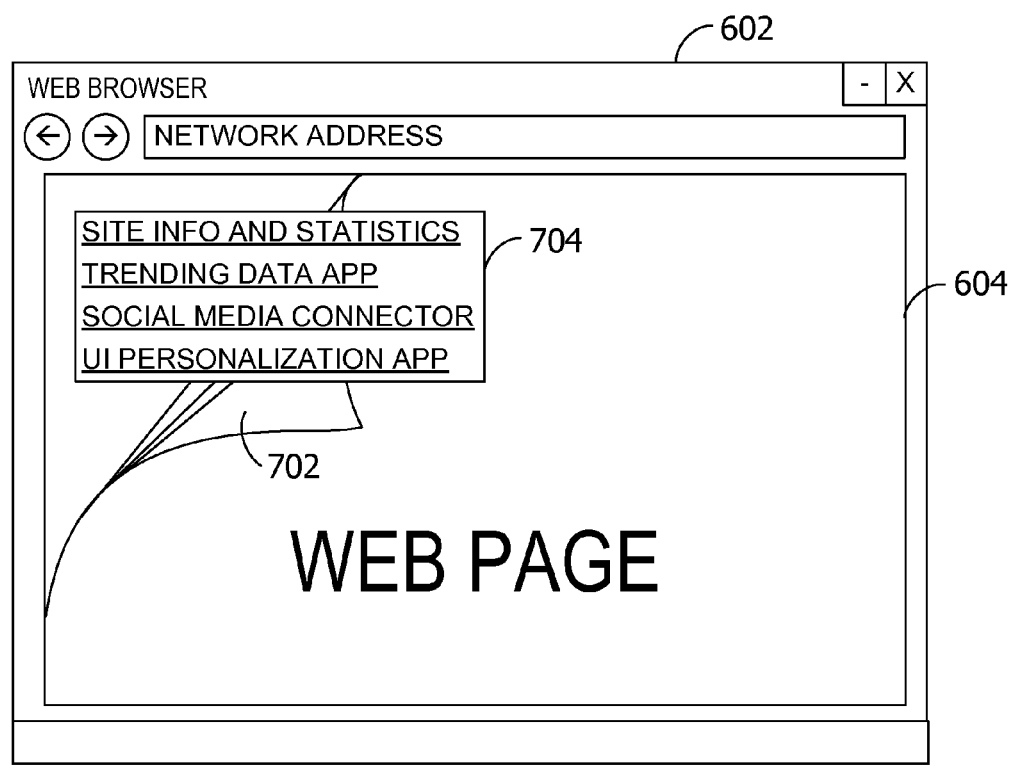
FIG. 7 is an exemplary user interface illustrating the web browser of FIG. 6 with an activated page curl showing a set of the available page applications for the web page.

Referring next to FIG. 7, an exemplary user interface illustrates the web browser 602 of FIG. 6 with an activated page curl 702 showing a set 704 of the available page applications for the web page 604. The user 102 has selected or activated the page curl 606 (e.g., by clicking or dragging the page curl 606, or by hovering over the page curl 606). The web browser 602 displays the page applications that are associated with the web page 604 and/or the user 102. The set 704 of page applications may include page applications provided by the web site owner and/or installed by the user 102. In the example of FIG. 6, the set 704 of page applications associated with the web page 604 and/or the user 102 includes page applications for obtaining, generating, and/or displaying site information and statistics, trending data, social media information, and user interface personalization data. For example, a social media connector, when executed, may search social media content of the user 102 for messages referencing the web page 604. The messages represent reviews or feedback on the web page 604. In another example, a user interface personalization page application, when executed, may apply a user-selected theme or other personalization to the web page 604 (e.g., background image, font, etc.).

In some embodiments (not shown), the set 704 of page applications may also display ratings for each of the page applications. The ratings represent, for example, collective user feedback on each page application and/or statistical data such as a quantity of installations by users 102. The ratings enable the user 102 to make informed decisions when selecting page applications to execute and/or install.

Upon selection of one or more of the displayed page applications, the user computing device 104 executes the selected page applications to perform the functionality associated therewith. For example, control passes to the selected page application. The selected page application is able to access contextual information about the web page 604 as well as access data on the web page 604. Upon completion of execution, or based on user input, control passes back to the web page 604 as the web browser 602 returns to the foreground with the page applications hidden under the page curl 606.

Additional Examples

While reference is made in some embodiments to the web browser 112 or a web page, aspects of the disclosure are not limited to the browser 112 accessing the Internet. Rather, aspects of the disclosure are operable with the browser 112 accessing content on any network including, but not limited to, intranets and/or peer-to-peer networks.

Aspects of the disclosure provide user management of the page applications 110. In some embodiments, the page application service 106 enables the user 102 to access and manipulate the relationships illustrated in FIG. 2. For example, the user 102 provides authentication information to the page application service 106 (e.g., logs in to a web site associated with the page application service 106). Upon successful (e.g., valid) authentication, the user 102 is able to view the page applications 110 associated with each web page, remove associations, and make new associations. For example, the user 102 may link installed page applications 110 to additional web pages, install additional page applications 110, and/or uninstall page applications 110.

In some embodiments, data generated by or otherwise associated with one of the page applications 110 is accessible by the user 102 when visiting the web page from any computing device. For example, if the user 102 executes one of the page applications 110 while browsing from a laptop and generates data, the generated data is accessible to the page application 110 later when the user 102 browses from a mobile telephone.

At least a portion of the functionality of the various elements in FIGS. 1-3 may be performed by other elements in FIGS. 1-3, or an entity (e.g., processor, web service, server, application program, computing device, etc.) not shown in FIGS. 1-3.

In some embodiments, the operations illustrated in FIG. 4 and FIG. 5 may be implemented as software instructions encoded on a computer-readable medium, in hardware programmed or designed to perform the operations, or both. For example, aspects of the disclosure may be implemented as a system on a chip.

While no personally identifiable information is tracked by aspects of the disclosure, embodiments have been described with reference to data monitored and/or collected from users 102. In such embodiments, notice is provided to the users 102 of the collection of the data (e.g., via a dialog box or preference setting) and users 102 are given the opportunity to give or deny consent for the monitoring and/or collection. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media store information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

Although described in connection with an exemplary computing system environment, embodiments of the invention are operational with numerous other general purpose or special purpose computing system environments or configurations. Examples of well known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for adding the functionality to the web page via the page application 110, and exemplary means for associating the page applications 110 with the web page via the page application service 106.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system comprising:
a memory area associated with a user computing device, said memory area storing a page application provider;
a processor programmed to execute the page application provider on the user computing device to:
detect a request from a user of the user computing device for access to a web page;
provide, based on the detected request, a page application service with a network address associated with the web page and a user identifier associated with the user, wherein the user identifier identifies the user without regard to the user computing device currently used by the user;
receive, from the page application service and based on the provided network address and the user identifier, one or more page application identifiers associated with the network address and the user identifier, each of the page application identifiers identifying at least one of a plurality of page applications, said page applications providing functionality related to the web page, wherein providing the page application service with the network address and receiving the one or more page application identifiers occurs separate from obtaining the web page;

present, to the user, the web page and the page applications associated with the page application identifiers;

receive, from the user, a selection of at least one of the presented page applications; and execute the selected page application.

2. The system of claim 1, wherein the page application provider is associated with a web browser.

3. The system of claim 1, wherein the processor is programmed to present the web page and the page applications by displaying the page applications in a portion of the web page.

4. The system of claim 1, wherein the web page interacts with the page application during execution.

5. The system of claim 1, further comprising means for adding the functionality to the web page via the page application.

6. The system of claim 1, further comprising means for associating the page applications with the web page via the page application service.

7. A method comprising:

receiving notification of a web page being accessed by a user of a user computing device, the notification including a network address associated with the web page and a user identifier associated with the user, the notification being received based on the user computing device detecting a request from the user to access the web page, the user identifier identifying the user without regard to the user computing device currently used by the user;

identifying, based on the received network address and the user identifier, one or more page applications associated with the web page, said identified page applications providing functionality related to the web page;

presenting page application identifiers associated with the identified page applications to the user;

receiving, from the user, a selection of at least one of the presented page application identifiers; and providing one or more of the identified page applications corresponding to the received selection for execution by the user computing device, wherein identifying the one or more page applications occurs separate from obtaining the web page.

8. The method of claim 7, wherein receiving the notification, identifying the one or more page applications, presenting the page application identifiers, receiving the selection, and providing the page application are performed by one or more of the following: an application executed by the user computing device, and a page application service accessible by the user computing device via a network.

9. The method of claim 7, wherein identifying the one or more page applications comprises communicating with a page application service to identify the one or more page applications.

10. The method of claim 9, wherein the page application service maintains a set of one or more network addresses associated with each of the page applications.

11. The method of claim 9, further comprising:

installing on the user computing device the selected page application; and providing the page application service with the page application identifier associated with the selection, the user identifier, and thenetwork address associated with the web page.

12. The method of claim 7, wherein identifying the one or more page applications comprises identifying the one or more page applications based on the web page being accessed and the user identifier, said identified page applications having been installed previously by the user.

13. The method of claim 7, wherein identifying the one or more page applications comprises accessing a cache associated with the user computing device to identify the one or more page applications.

14. The method of claim 7, wherein presenting the identified page application identifiers to the user comprises presenting the identified page applications to the user with the web page.

15. The method of claim 7, wherein presenting the identified page application identifiers to the user comprises presenting the identified page applications as a portion of the web page.

16. The method of claim 7, wherein receiving the notification comprises receiving a network address associated with the web page.

17. One or more computer storage devices storing computer-executable components, said components comprising:

a monitor component that when executed by at least one processor causes the at least one processor to detect a request from a user of a user computing device for access to a web page;

a communications interface component that when executed by at least one processor causes the at least one processor of the user computing device to:

provide, to a page application service and based on the detected request, a network address associated with the web page and a user identifier associated with the user, wherein the user identifier identifies the user without regard to the user computing device currently used by the user;

receive, from the page application service, based on the provided network address and the user identifier, one or more page application identifiers associated with the network address and the user identifier, each of the page application identifiers identifying at least one of a plurality of page applications, the page applications providing functionality related to the web page, wherein providing the network address and the user identifier and receiving the one or more page application identifiers occurs separate from obtaining the web page;

a user interface component that when executed by at least one processor causes the at least one processor to:

present the page applications to the user; and receive, from the user, a selection of at least one of the presented page applications, wherein the user computing device executes the selected page application to provide the functionality; and a registration component that when executed by at least one processor causes the at least one processor to identify to the page application service the selected page application, the user, and the web page.

18. The computer storage devices of claim 17, wherein the registration component identifies to the page application service the selected page application, the user, and the web page by providing the page application identifier associated with the selected page application, the user identifier associated with the user, and the network address associated with the web page.

19. The computer storage devices of claim 17, wherein the registration component further executes to install the selected page application in response to the selection of at least one of the presented page applications received by the user interface component.

20. The computer storage devices of claim 17, wherein the user interface component presents the identified page applications to the user in a page curl associated with the web page.

* * * * *